Sept. 13, 1938.　　　　　A. FUNK　　　　　2,129,834
SPELLING BOARD
Filed June 5, 1937
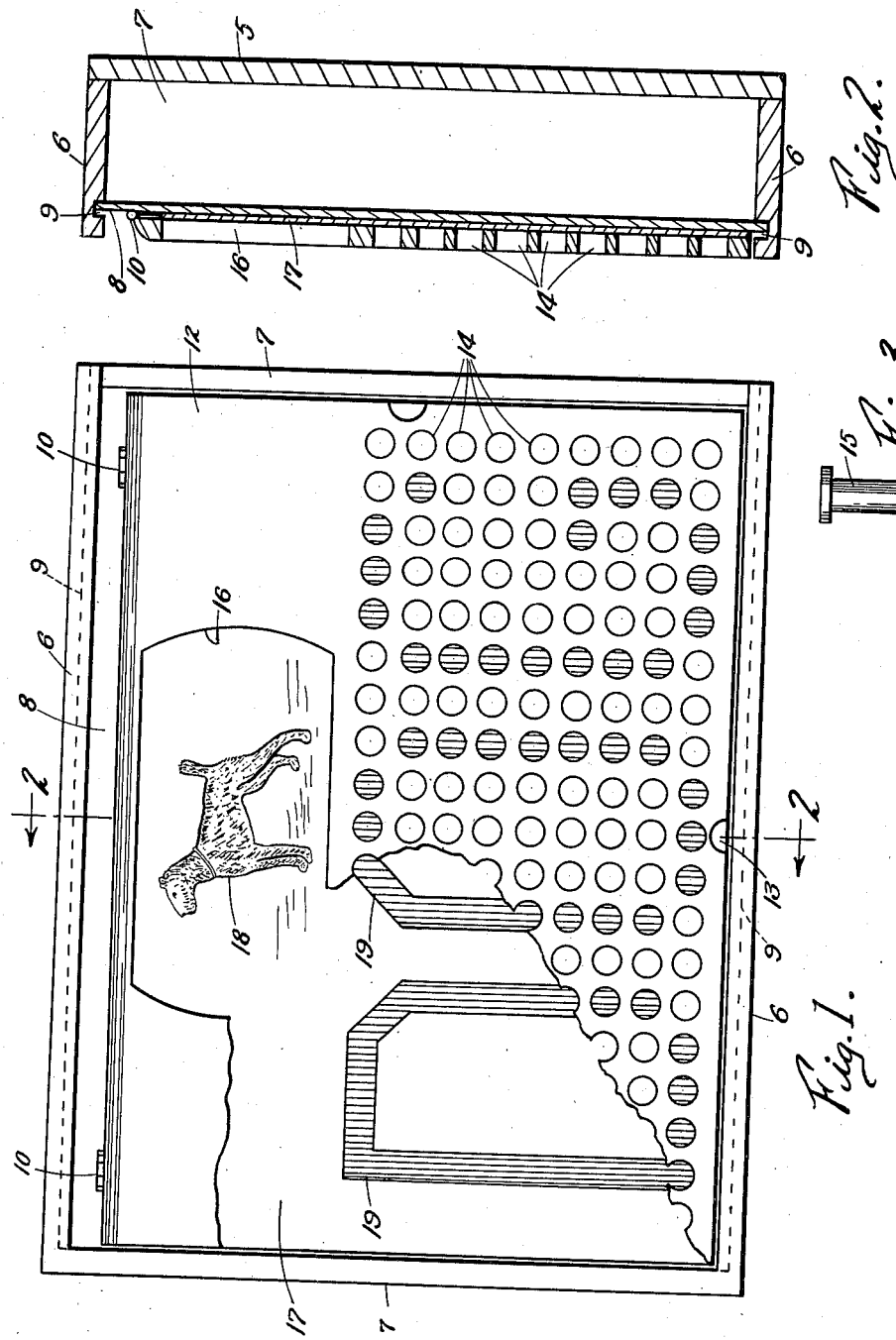
INVENTOR.
Alfred Funk
BY
ATTORNEYS Patented Sept. 13, 1938

2,129,834

UNITED STATES PATENT OFFICE 2,129,834

SPELLING BOARD

Alfred Funk, Cincinnati, Ohio

Application June 5, 1937, Serial No. 146,534

5 Claims. (Cl. 35—35)

This invention relates to a spelling board for use by small children learning to spell and to associate words with the objects named thereby.

An object of the invention is to provide a device of the character stated, which is designed to greatly facilitate the spelling of words, and to teach a child quickly the meaning of words spelled thereon.

Another object is to so construct a device of the character stated, that a child's interest is retained while learning to spell.

A further object of the invention is to provide a spelling board which is designed to accomplish its purposes with the use of simple and inexpensive means, and which is not too highly mechanized for apprehension by young minds.

Another object is to make the device of the invention very compact and instantly ready for use, none of the parts of which are consumable or destructible so as to require replacements in order to use it.

These and other objects are attained by the means described herein and disclosed in the accompanying drawing, in which:

Fig. 1 is a top plan view of the spelling board of the invention.

Fig. 2 is a cross-sectional view taken on line 2—2 of Fig. 1.

Fig. 3 is an elevational view of a peg or plug for use with the spelling board.

Spelling boards and other devices for the teaching of small children are known to be a most desirable type of toy, provided that they are properly designed to command the interest and attention of the young mind. Various types of spelling boards have been proposed, which upon careful analysis have been found wanting in features necessary to a proper mode of instruction. For example, certain known types of spelling boards are complicated and too highly mechanized to properly afford the desired instruction, the child's attention being thereby diverted from the real purpose of the device. Other types of spelling boards contain parts to be destroyed or mutilated, which is a result not conducive to a proper instructive training of a child during periods in which an attempt is made to obviate destructive tendencies. These undesirable features of the prior devices have been eliminated from the spelling board of the present invention, with the object of enforcing, at certain times, at least, influences of a character not possessed by toys ordinarily.

In accordance with the present invention, there is provided a box having a bottom 5, side walls 6, and end walls 7, the box being closed by means of a lid 8 slidable in grooves or ways 9 provided in the side walls of the box. The grooves are so arranged that the lid slides in substantial parallelism with the bottom of the box. The lid 8 is plain and without apertures or openings, so as to provide a back board which serves as a stop for pegs or plugs as will hereinafter be explained.

Upon the outer face of the lid or back board, there is hinged, as at 10, a peg board 12 having a thumb opening 13 or its equivalent, whereby the peg board may be swung about the hinges, to and from an operative position at which it is substantially in flatwise abutment upon the back board 8. From the foregoing, it is to be understood that the peg board has two movements, one being a movement about the hinges 10 and the other being a longitudinal movement bodily with the back board 8.

The peg board is provided with multiple rows of peg openings 14 which are substantially equally spaced apart, and adapted for the reception of suitable pegs 15, one form of which is shown in Fig. 3. The peg board is provided with a window 16, the purpose of which will be explained presently.

The character 17 indicates a card or sheet of substantially the size of the peg board, said sheet bearing a picture 18 and a corresponding word made up of letters 19 which are preferably printed thereon in colors. The sheet 17 is adapted to be interposed between the hinged peg board 12 and the back board 8, with the picture 18 registering with the window 16, and with the colored letters 19 registering substantially with certain ones of the peg holes 14, the purpose being to enable a child to observe the colored letters through those peg holes which are in registration therewith. The peg holes are made sufficiently large to enable ready visibility of the colored letters of sheet 17 when viewed from the top of the device, through the peg holes. Thus, a child using the device will recognize the picture 18, and by inserting pegs through the holes 14 in which he can see the colored letters 19, will spell the word or name which describes the picture 18 at the top of the sheet 17. It should be noted that the sheet 17 rests flatly upon the back board or lid 8, so that it may not be punctured by the insertion of pegs in the peg holes. In the preferred form of the invention, the peg board flatly contacts the sheet 17 to prevent shifting movement thereof, however, other forms of means for preventing such movement of the sheet may be employed, if desired, should it be found desirable to maintain the peg board in spaced parallelism with the back board.

As will be understood, the spelling board of the invention is furnished with a series of cards or sheets such as 17, each bearing a different picture and corresponding names, so that the child using the device will be enabled to spell, with the use of pegs such as 15, the names of various animals, flowers, or other objects forming the subject matter of any replaceable sheet 17.

It will readily be understood from the foregoing, that continued use of the spelling board does not result in destruction or mutilation of any of its constituents, and that even very young children may be benefitted materially by using the device. The box of which the back board 8 furnishes the lid or cover therefor, furnishes a convenient compartment for a set of pegs and additional cards or sheets such as 17.

The letters 19 of sheet 17 are indicated as being printed with the color red, however, the color to be employed is optional, it being possible to print the letters in black upon a white background, or in white upon a black background, if desired. Various other modifications and changes in the structural details of the device may be made, within the scope of the appended claims, without departing from the spirit of the invention.

What is claimed is:

1. In an instruction device, the combination of a plain back board having a solid face, a peg board having multiple rows of peg holes extending through the peg board, said peg board being placeable flatwise upon the back board with a figure-bearing sheet interposed between said boards, the figures of said sheet being colored and applied thereto at a location such as to be visible through certain holes of the peg board, said holes being sufficiently large and their spacing proportioned to insure ready visibility of parts of said figures, and pegs to be inserted in such ones of the peg holes as are contrasted with the others by reason of the presence of the colored figures, the figure-bearing sheet being supported flatwise and directly upon the plain back board to preclude puncture of the sheet by the insertion of pegs in the peg board holes.

2. In a spelling device, the combination of a plain back board having a solid face, a peg board having multiple rows of peg holes extending through the peg board, said peg board being placeable flatwise upon the back board, a removable sheet to be interposed between said boards, said sheet bearing colored letters arranged to spell a word, with the letters so proportioned as to coincide substantially with some of the peg holes of the peg board, the peg holes being sufficiently large to insure ready visibility of parts of said figures therethrough, and pegs to be inserted in such ones of the peg holes as are contrasted with the others by the presence of the colored figures, the figure-bearing sheet being supported directly upon the plain back board to preclude puncture of the sheet by the insertion of pegs, in the peg board holes, to indicate the spelling of the word borne by the sheet.

3. In an instruction device of the character described, the combination of a box having bottom, side, and end walls, and a lid slidable along the side walls in substantial parallelism with the bottom wall, said lid being plain with a solid face providing a back board, a peg board hinged to the box lid and having formed therein a series of rows of peg holes substantially equally spaced apart, said peg board being hingedly movable to a position of flatwise contact upon the box lid, a removable sheet to be interposed between the lid and the peg board, said sheet bearing colored letters arranged to spell a word, with the letters so proportioned as to coincide substantially with certain of the holes of the peg board, the peg holes being sufficiently large to insure ready visibility of parts of said figures therethrough, and pegs to be inserted in such ones of the peg holes as are contrasted with the others by the presence of the colored figures, the figure-bearing sheet being supported directly upon the box lid to preclude puncture of the sheet by the insertion of pegs, in the peg board holes, to indicate the spelling of the word borne by the sheet.

4. In an instruction device, the combination of a plain back board having a solid face, a peg board having a window and multiple rows of peg holes extending through the peg board, said peg board being placeable flatwise upon the back board, a removable sheet to be interposed between said boards, said sheet bearing a picture observable through the peg board window and a series of colored letters arranged to spell the name of the picture, with the letters so proportioned as to coincide substantially with certain of the peg holes of the peg board, the peg holes being sufficiently large to insure ready visibility of parts of said letters therethrough, and pegs for insertion in such ones of the peg holes as are contrasted with the others by the presence of the colored letters, the flatwise disposition of the sheet upon the back board serving to prevent puncture of the sheet by the pegs inserted through the holes of the peg board.

5. In an instruction device of the character described, the combination of a box having bottom, side, and end walls, and a lid slidable along the side walls in substantial parallelism with the bottom wall, said lid providing a back board with a solid face, a peg board having a window and multiple rows of peg holes extending through the peg board, said peg board being placeable flatwise upon the back board, a removable sheet to be interposed between said boards, said sheet bearing a picture observable through the peg board window and a series of colored letters arranged to spell the name of the picture, with the letters so proportioned as to coincide substantially with certain of the peg holes of the peg board, the peg holes being sufficiently large to insure ready visibility of parts of said letters therethrough, and pegs for insertion in such ones of the peg holes as are contrasted with the others by the presence of the colored letters, the flatwise disposition of the sheet upon the back board serving to prevent puncture of the sheet by the pegs inserted through the holes of the peg board.

ALFRED FUNK.